(12) United States Patent
Kotecha et al.

(10) Patent No.: US 8,812,814 B2
(45) Date of Patent: *Aug. 19, 2014

(54) USER EQUIPMENT BUFFER MANAGEMENT IN MULTIPLE-INPUT MULTIPLE-OUTPUT COMMUNICATION SYSTEMS

(71) Applicant: Apple Inc., Cupertino, CA (US)

(72) Inventors: Jayesh H. Kotecha, Austin, TX (US); Ning Chen, Austin, TX (US); Ian C. Wong, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,098

(22) Filed: Apr. 29, 2013

(65) Prior Publication Data

US 2013/0308528 A1 Nov. 21, 2013

Related U.S. Application Data

(63) Continuation of application No. 12/056,258, filed on Mar. 26, 2008, now Pat. No. 8,433,878.

(51) Int. Cl.
*G06F 12/00* (2006.01)

(52) U.S. Cl.
USPC .......................... 711/173; 711/170; 370/328

(58) Field of Classification Search
USPC .................................. 711/170–173; 370/328
See application file for complete search history.

(56) References Cited

U.S. PATENT DOCUMENTS

| 6,229,789 B1 | 5/2001 | Simpson et al. |
| 2010/0015923 A1 | 1/2010 | Golitschek |

*Primary Examiner* — Jasmine Song
(74) *Attorney, Agent, or Firm* — Fay Kaplun & Marcin, LLP

(57) ABSTRACT

Embodiments of the disclosure provide a system and method for dynamically allocating storage capacity in a user equipment buffer. In various embodiments of the invention, a plurality of transport blocks associated with a process are stored in a plurality of subpartitions of a partition of a buffer in a user equipment device.

18 Claims, 4 Drawing Sheets

USER EQUIPMENT BUFFER MANAGEMENT IN MULTIPLE-INPUT MULTIPLE-OUTPUT COMMUNICATION SYSTEMS

PRIORITY

This application is a continuation of and claims priority to co-owned U.S. patent application Ser. No. 12/056,258 filed on Mar. 26, 2008 and entitled "USER EQUIPMENT BUFFER MANAGEMENT IN MULTIPLE-INPUT MULTIPLE-OUTPUT COMMUNICATION SYSTEMS", issuing as U.S. Pat. No. 8,433,878, the foregoing being incorporated herein by reference in its entirety.

BACKGROUND OF THE INVENTION

1. Field of the Invention

The present invention is directed in general to the field of information processing. In one aspect, the present invention relates to a system and method for improving the efficiency of data buffers in user equipment devices used in multiple-input, multiple-output devices.

2. Description of the Related Art

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. Such wireless communication systems are increasingly used to distribute or "broadcast" audio and/or video signals (programs) to a number of recipients ("listeners" or "viewers") that belong to a large group. An example of such a wireless system is the 3GPP LTE (Long Term Evolution) system depicted in FIG. 1, which schematically illustrates the architecture of an LTE wireless communication system 1. As depicted, the broadcast server 28 communicates through an EPC 26 (Evolved Packet Core) which is connected to one or more access gateways (AGW) 22, 24 that control transceiver devices, 2, 4, 6, 8 which communicate with the end user devices 10-15. In the LTE architecture, the transceiver devices 2, 4, 6, 8 may be implemented with base transceiver stations (sometimes referred to herein as enhanced "Node-B" or "eNB" devices) which in turn are coupled to Radio Network Controllers or access gateway (AGW) devices 22, 24 which make up the UMTS radio access network (collectively referred to as the UMTS Terrestrial Radio Access Network (UTRAN)). Each transceiver device 2, 4, 6, 8 includes transmit and receive circuitry that is used to communicate directly with any mobile end user(s) 10-15 located in each transceiver device's respective cell region. Thus, transceiver device 2 includes a cell region 3 having one or more sectors in which one or more mobile end users 13, 14 are located. Similarly, transceiver device 4 includes a cell region 5 having one or more sectors in which one or more mobile end users 15 are located, transceiver device 6 includes a cell region 7 having one or more sectors in which one or more mobile end users 10, 11 are located, and transceiver device 8 includes a cell region 9 having one or more sectors in which one or more mobile end users 12 are located. With the LTE architecture, the eNBs 2, 4, 6, 8 are connected by an S1 interface to the EPC 26, where the S1 interface supports a many-to-many relation between AGWs 22, 24 and the eNBs 2, 4, 6, 8.

As will be appreciated, each transceiver device, e.g., eNB 2, in the wireless communication system 1 includes a transmit antenna array and communicates with a user equipment device, e.g., user equipment (UE) 15, having a receive antenna array, where each antenna array includes one or more antennas. The wireless communication system 1 may be any type of wireless communication system, including but not limited to a MIMO system, SDMA system, CDMA system, SC-FDMA system, OFDMA system, OFDM system, etc. Of course, the user equipment devices, e.g., UE 15, can also transmit signals which are received by the Node-B, e.g., eNB 2. The signals communicated between transmitter 102 and user equipment device 104 can include voice, data, electronic mail, video, and ether data, voice, and video signals.

Various transmission strategies require the Node-B to have some level of knowledge concerning the channel response between the Node-B and each user equipment device, and are often referred to as "closed-loop" systems. An example application of closed-loop systems which exploit channel-side information at the Node-B (transmitter) ("CSIT") are precoding systems, such as space division multiple access (SDMA), which use closed-loop systems to improve spectrum usage efficiency by applying precoding at the Node-B to take into account the transmission channel characteristics, thereby improving data rates and link reliability. SDMA based methods have been adopted in several current emerging standards such as IEEE 802.16 and the 3rd Generation Partnership Project (3GPP) Long Term Evolution (LTE) platform. With such precoding systems, CSIT can be used with a variety of communication techniques to operate on the transmit signal before transmitting from the transmit antenna array. For example, precoding techniques can provide a multi-mode beamformer function to optimally match the input signal on one side to the channel on the other side. In situations where channel conditions can be provided to the Node-B, closed loop methods, such as MIMO precoding, can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the transmit array.

With conventional closed-loop MIMO systems, full broadband channel knowledge at the Node-B may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the Node-B.

In the LTE platform, data transmitted between the Node-B and the various UEs is configured in a plurality of "transport blocks" (TBs), comprising a plurality of symbols. Control information associated with TBs typically comprises three data bits that are reserved for identification of a process that the TBs are associated with. TBs received by a UE are initially stored in a buffer prior to processing to extracting data therefrom. In the current LTE standard, the Node-B configures the buffer in the UE to create a plurality of partitions having a predetermined size to store transport blocks corresponding to predetermined processes. Thus, in the non-MIMO case, for each process ID associated with a transport block, the UE will store transport block information in the corresponding partition of the buffer. The set of possible buffer sizes that the Node-B may use is configured using RRC signaling. However, the non-MIMO buffer partitioning scheme does not work for MIMO since two possible transport blocks may be sent with one process ID associated with both transport blocks.

Accordingly, an efficient methodology is needed to for management of the allocation incoming transport blocks to partitions of a UE buffer. In particular, there is a need for an efficient methodology for allocating buffer storage for multiple transport blocks associated with a particular process. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
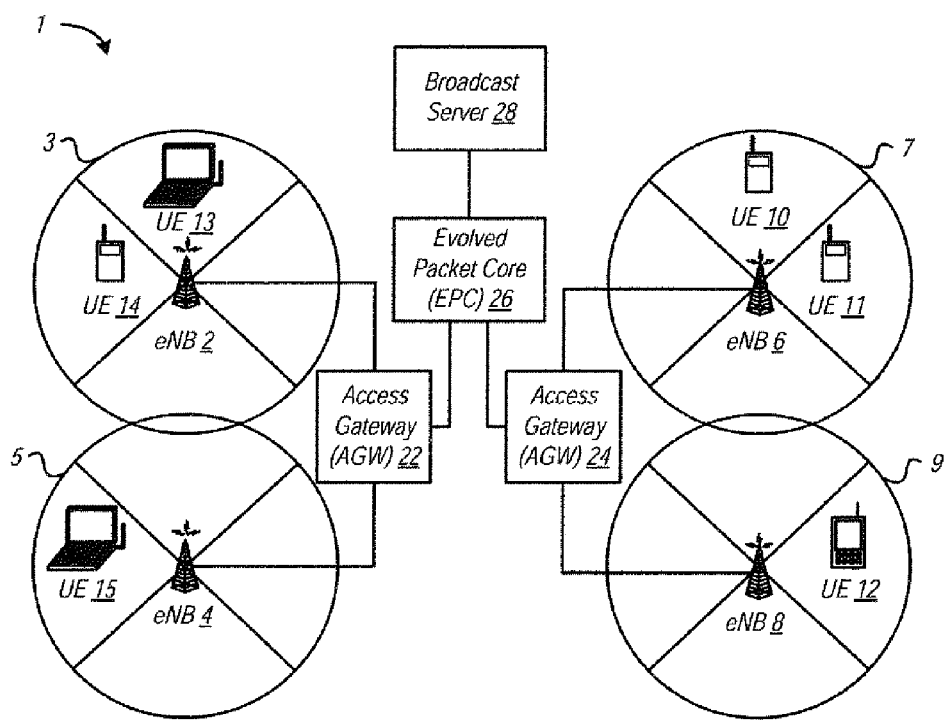
FIG. 1 schematically illustrates the architecture of an LTE wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

Embodiments of a system and methodology are disclosed for an efficient methodology for managing the storage of incoming transport block in a plurality of partitions in a UE buffer. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
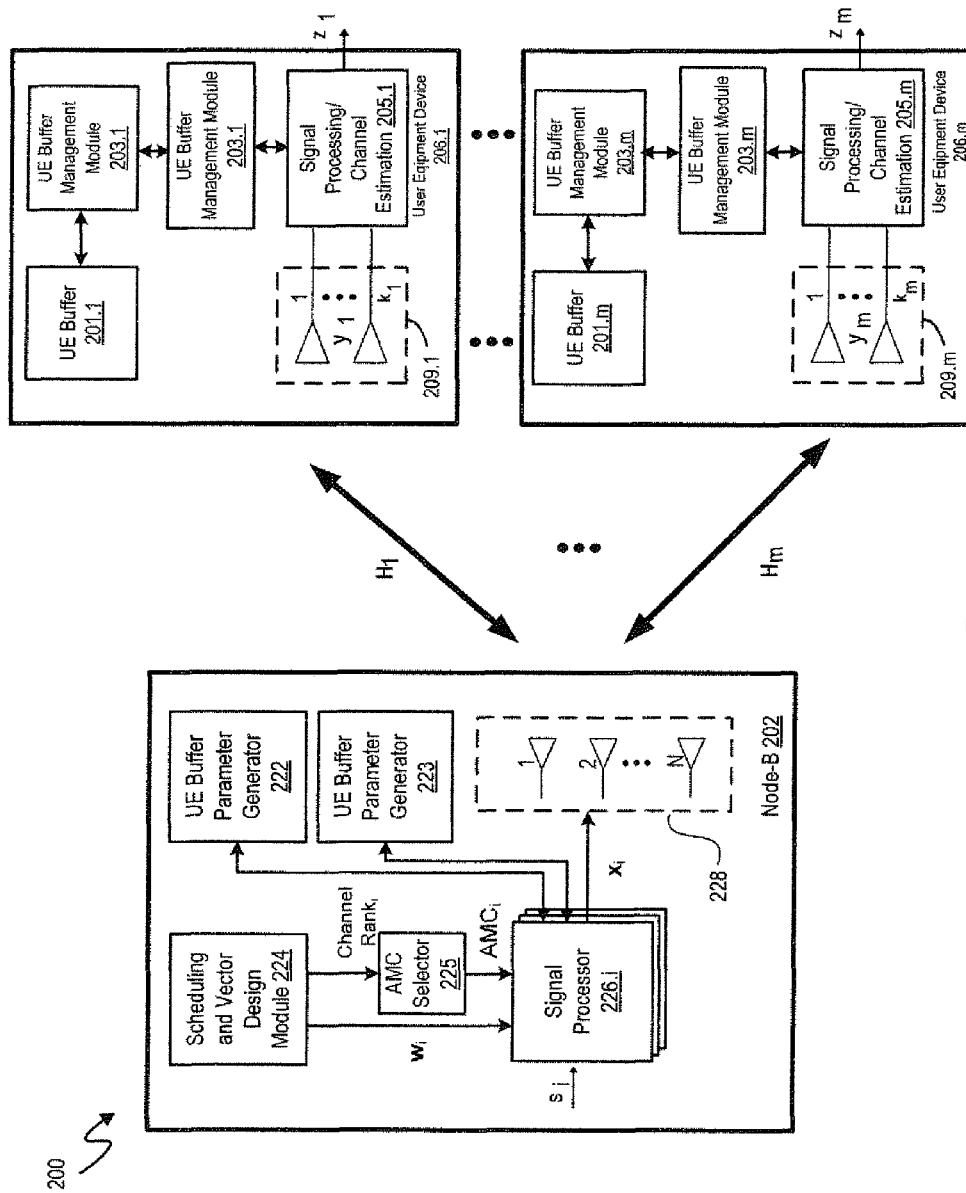
FIG. 2 depicts a wireless communication system in which one or more user equipment devices feed back information to a Node-B station for use in scheduling or otherwise precoding signal transmissions by the Node-B station.

FIG. 2 depicts a wireless communication system 200 in which a Node-B station 202 communicates with one or more user equipment devices 206.$i$. With reference to the LTE wireless system depicted in FIG. 1, the Node-B 202 may represent any of the control transceiver devices, 2, 4, 6, 8 which act as a base station, while the user equipment device 206.$i$ may represent any of the end user devices 10-15. As will be appreciated, the Node-B station 202 and/or user equipment devices 206.$i$ include a processor, software executed by the processor, and other hardware that allow the processes used for communication and any other functions performed by the Node-B station 202 and each of user equipment devices 206.$i$. It will also be appreciated that the Node-B station 202 can both transmit signals (over the downlink path) and receive signals (over the uplink path), and that each user equipment device 206.$i$ can receive signals (over the downlink path) and transmit signals (over the uplink path).

The Node-B 202 includes an array 228 of one or more antennas for communicating with the user equipment devices 206.$l$ through 206.$m$, each of which includes an array 209.$i$ having one or more antennas for communicating with the Node-B 202. In operation, a data signal $s_i$ presented at the Node-B 202 for transmission to the user equipment device 206.$i$ is transformed by the signal processor 226.$i$ into a transmission signal, represented by the vector $x_i$. The signals transmitted from the transmit antenna 228 propagate through a matrix channel $H_i$ and are received by the receive antennas 209.$i$ where they are represented by the vector $y_i$. For a MIMO channel from the Node-B 202 to the $i^{th}$ user equipment device 206.$i$, the channel is denoted by $H_i$, $i \in \{1, 2, \ldots, m\}$. The channel matrix $H_i$ may be represented as a $k_i \times N$ matrix of complex entries representing the complex coefficients of the transmission channel between each transmit-receive antenna pair, where N represents the number of transmit antennas in the transmit antenna array 228, and $k_i$ represents the number of antennas of the user equipment device 206.$i$. At the user equipment device 206.$i$, the signal processing unit 205.$i$ processes the $y_i$ signals received on the k antennas to obtain a data signal, $z_i$, which is an estimate of the transmitted data $s_i$.

Precoding for downlink transmissions (Node-B to user equipment device) may be implemented by having each user equipment device 206.$i$ determine its MIMO channel matrix $H_i$—which specifies the profile of the transmission channel between a Node-B and an $i^{th}$ user equipment device—in the channel estimation signal processing unit 205.$i$. For example, in a MIMO implementation, each user equipment device 206.$l$-$m$ determines its MIMO channel matrix $H_i$ by using pilot estimation or sounding techniques to determine or estimate the coefficients of the channel matrix $H_i$. Each user equipment device 206.$i$ uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. In addition, each user equipment device 206.$i$ uses the estimated MIMO channel matrix or other channel-related information to generate channel rank information that is to be used to configure/adapt the signals transmitted by the Node-B.

In communication systems configured in accordance with the LTE platform, data symbols are transmitted in groups referred to as transport blocks (TB). Prior communication systems have provided for up to eight multiple processes, e.g., voice, video, etc., to be supported simultaneously. In current versions of the LTE platform, up to 16 processes can be supported simultaneously. Control information associated with each TB, includes three bits reserved for a process identifier (ID). Incoming TBs are initially stored in a UE buffer 201.*i* in a plurality of storage partitions that are configured by a UE buffer management module 203.*i*. Some parameters for configuring the partitions in the UE buffer 201.*i* are generated by a UE buffer parameter generator 222 and are communicated to the UE buffer management module 203.*i* via a RRC. Other parameters for configuring the partitions in the UE buffer 201.*i* are generated by a control parameter generator 223 and are communicated to the control parameter decoder module 207.*i*. Embodiments of the invention as described herein provide the functionality for the Node-B to generate information that can be used by the UE to dynamically allocate variable sizes to the sub-partitions in which transport blocks associated with a process are stored.

Figure 3:
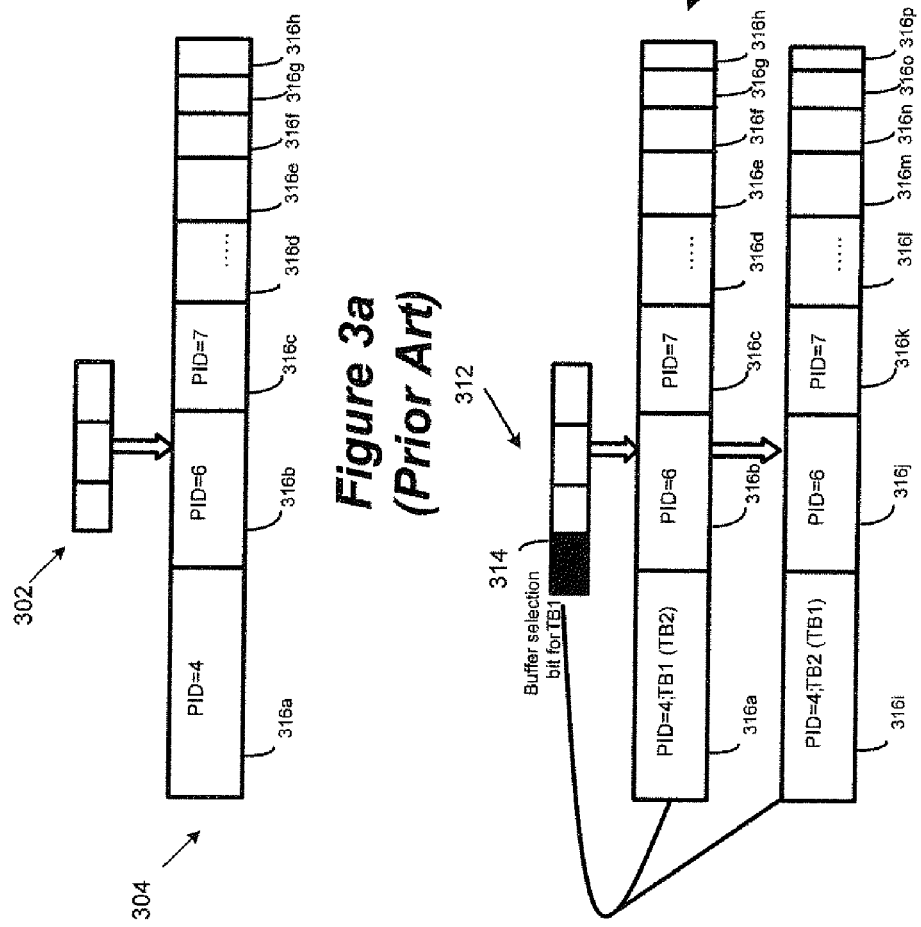
FIG. 3a is an illustration of mapping of incoming transport blocks to a UE buffer using a three-bit coding format.
FIG. 3b is an illustration of a prior art technique for mapping incoming transport blocks to memory buffers using a four-bit coding format.

FIG. 3a is an illustration of a three-bit address mapping methodology used in non-MIMO high-speed packet access (HSPA) systems. In the methodology shown in FIG. 3a, each of the eight possible concurrent transport blocks are associated with a process ID using a 3 bit process ID field 302. This 3 bit field is used by the UE to store the transport block information in the corresponding assigned partitions 306a-h in the buffer 304.

For the MIMO case, shown in FIG. 3b, there are two buffers 308 and 310 comprising buffer partitions 316a-p. A four bit process ID field 312 is used to map the two simultaneously transmitted transport blocks into the partition. One bit is used to choose the buffer for the first transport block, e.g., TB1 is mapped to partition 316a, and the second transport block, TB2, is mapped to the partition 316i in buffer 310. The three other bits are mapped to the partitions.

Figure 4:
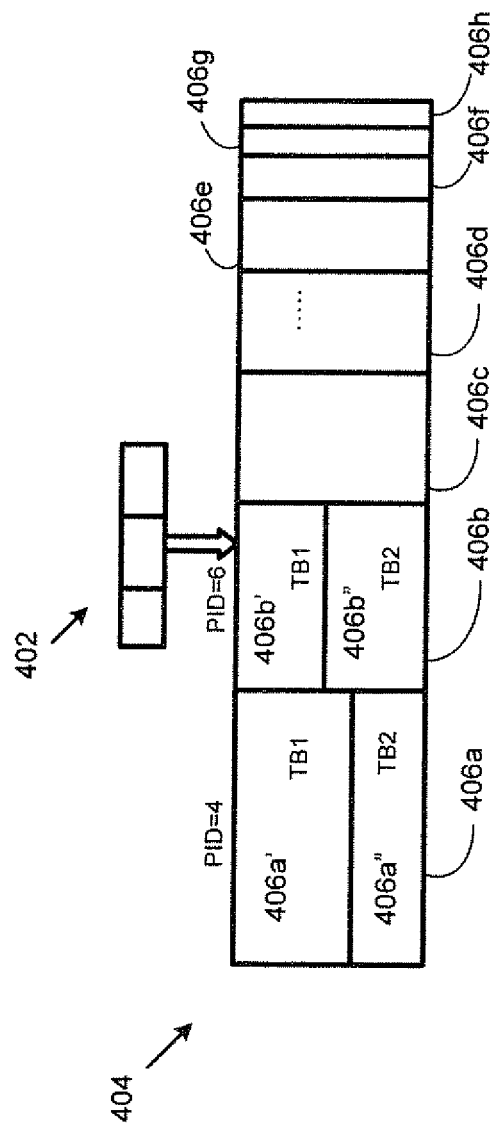
FIG. 4 is an illustration of a prior art technique for mapping incoming transport blocks to memory buffers using a three-bit coding format in accordance with embodiments of the invention.

FIG. 4 is an illustration of the methodology implemented in embodiments of the present invention. A three bit process ID field 402 is used to map at least sixteen TBs associated with eight processes into sixteen subpartitions. A buffer 404 comprises eight partitions, 406 a-h, that are further divided into a plurality of subpartitions having variable boundaries that allow the storage capacity of individual subpartitions to be allocated dynamically, such that the ratio of sizes of buffer space allocated to each transport block can vary in each partition. For example, partition 406a can be further partitioned to provide subpartition 406a' and 406a" and partition 406b can be further partitioned to provide subpartitions 406b' and 406b". The storage capacities of the subpartitions 406a' and 406a" are set to a size that allows storage of the information contained in transport blocks TB1 and TB2 associated with the process associated with process identifier 4. Likewise, the storage capacities of the subpartitions 406b' and 406b" are set to a size that allows storage of the information contained in transport blocks TB1 and TB2 associated with the process associated with process identifier 6. The other partitions 406c-h can be further partitioned to provide storage for transport blocks associated with other processes.

The ratio of individual subpartitions can be allocated in several ways. In one embodiment, the desired ratio of the subpartitions is signaled in a new/first transmission using the ratio of the TB sizes in the new/first transmission. In some embodiments, the ratio is varied for every new transmission and lasts till the process is completed. The dynamic allocation of the storage capacities of the subpartitions can be provided by using functionality in the PHY layer which includes control information associated with individual transport blocks.

In other embodiments, the ratio can be semi-statically configured to last for a certain time window using higher layers such as the RRC.

In some embodiments of the invention, the UE is operable to deduce the sizes of the subpartition storage capacities using control information sent by the PHY layer of a Node-B. In other embodiments, the UE is operable to implicitly deduce the ratio of the subpartitions by calculating the ratio of the sizes of the TBs. In some embodiments, the UE is operable to implicitly calculate the ratios by using the modulation and coding scheme (MCS) levels of the TBs. In these embodiments, the MCS values and the number of resource blocks associated with the TBs are used to deduce the TB size. In another embodiment, a table can be used which associates ratios of the sizes of the sub-partitions to the MCS values of the corresponding transport blocks. In other embodiments, the ratios are calculated using parameters used to derive the TB sizes by the Node-B.

In some embodiments of the invention, the UE identifies the partition associated with the transmitted process which may have a plurality of transport associated with the process. After having deduced the sizes of the transport blocks, it calculates the sizes of sub-partitions and their locations in the UE buffer. Consequently, the UE stores information from the received transport blocks in the corresponding assigned sub-partitions. For example, as shown in FIG. 4, if there are two transport blocks sent, then information from the first transport block is stored in the first sub-partition and information from the second transport block is store in the second sub-partitions.

In some embodiments of the invention, a hybrid automatic repeat request (HARQ) may be present, wherein transport blocks, which are received in error by the UE, are retransmitted by the Node-B. The retransmissions are repeated for a finite number of tries. In these embodiments, the UE will store the information of the retransmissions of transport block in the same sub-partition in which the information first/new transmission was stored.

Although the embodiment illustrated in FIG. 4, provides sixteen subpartitions, embodiments of the invention are implemented using more buffer partitions and more than two subpartitions per partition. When "n" transport blocks per process are transmitted, buffer space allocated to any given TB can be configured using a value equal to (sum of TB/sum of sizes of all TBs)*(size of assigned partition), where * indicates multiplication. In addition, the resource identifier field can be increased from three bits to "m" bits so that $2^m$ processes can be supported.

In some embodiments, the Node-B will assign a process identifier based on the sum of the sizes of the plurality of transport block associated with the process identifier. The invention provides the ability for the Node-B to generate information that can be used by the UE to dynamically allocate variable sizes to the sub-partitions in which transport blocks associated with a process are stored.

The methods and systems for an efficient system and method for managing the storage of incoming storage blocks in a UE buffer as shown and described herein may be implemented in software stored on a computer-readable medium and executed as a computer program on a general purpose or special purpose computer to perform certain tasks. For a hardware implementation, the elements used to perform various signal processing steps at the Node-B (e.g., coding and modulating the data, precoding the modulated signals, pre-conditioning the precoded signals, extracting channel rank reports from the uplink messages and so on) and/or at the receiver (e.g., recovering the transmitted signals, demodulating and decoding the recovered signals, detecting changes in the user equipment device state that require feedback of channel-side information and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the Node-B and user equipment device may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various feedback systems and methods for using same, the present invention is not necessarily limited to the example embodiments illustrated herein. For example, various embodiments of a channel rank feedback system and methodology disclosed herein may be implemented in connection with various proprietary or wireless communication standards, such as IEEE 802.16e, 3GPP-LTE, DVB and other multi-user systems, such as wireless MIMO systems, though channel rank information can also be used in non-MIMO communication systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing signals in user device useful with a communication system, the method comprising:
dividing a memory buffer in the user device into a plurality of partitions;
further dividing each of the memory buffer partitions into a plurality of subpartitions, the subpartitions having a dynamically-allocated storage capacity;
receiving a plurality of incoming transport blocks, where individual incoming transport blocks of the plurality of incoming transport blocks are associated with respective individual processes;
storing the individual incoming transport blocks associated with the respective individual processes in the subpartitions; and
dynamically reallocating variable storage capacities for each of the subpartitions in the partitions such that a size of the subpartitions changes between successive transmission periods.

2. The method of claim 1, wherein at least a portion of the plurality of the incoming transport blocks are associated with a single process.

3. The method of claim 1, wherein a storage capacity of a subpartition is allocated based on a ratio of a size of transport block to be stored in the subpartition to a total combined size of transport blocks to be stored all subpartitions in the respective partition.

4. The method of claim 1, further comprising calculating storage capacities of the subpartitions of the user device memory buffer using parameters provided by a base station.

5. The method of claim 1, wherein:
each individual partition comprises two subpartitions; and
the buffer comprises sixteen individual subpartitions associated with eight individual processes.

6. The method of claim 5, wherein the storage of the individual transport blocks in the subpartitions of the partitions comprises an address protocol using a maximum of three address bits.

7. A user device comprising:
a wireless interface;
a memory buffer; and
computerized logic in data communication with the wireless interface and the memory buffer, the computerized logic configured to cause the user device to:
divide the memory buffer into a plurality of partitions;
further divide at least some of the plurality of partitions into a plurality of subpartitions, the subpartitions having a dynamically-allocated storage capacity;
receive a plurality of incoming transport blocks, where individual incoming transport blocks are associated with respective individual processes;
store the individual transport blocks associated with the respective individual processes in at least some of the subpartitions; and
dynamically reallocating variable storage capacities for each of the subpartitions in the partitions such that a size of the subpartitions changes between successive transmission periods.

8. The user device of claim 7, wherein at least a portion of the plurality of the transport blocks are associated with a single process.

9. The user device of claim 7, wherein a storage capacity of a subpartition is allocated based on at least a ratio of a size of transport block to be stored in the subpartition to a total combined size of transport blocks to be stored within all subpartitions in the respective partition.

10. The user device of claim 7, wherein the storage capacities of the subpartitions of the memory buffer are based at least in part of a modulation and coding scheme associated with the incoming transport blocks.

11. The user device of claim 7, wherein storage capacities of the subpartitions of the memory buffer are allocated using parameters provided by a base station.

12. The user device of claim 11, wherein the storage of the individual transport blocks in the subpartitions of the partitions comprises an address protocol using a maximum of three address bits.

13. The user device of claim 7, wherein:
each individual partition comprises two subpartitions; and
the memory buffer comprises sixteen individual subpartitions associated with eight individual processes.

14. A method for processing signals in a user device useful with a communication system, the method comprising:
dividing a memory buffer in the user device into a plurality of partitions;
further dividing each of the memory buffer partitions into a plurality of subpartitions, the subpartitions having a dynamically-allocated storage capacity;
receiving a plurality of incoming transport blocks, wherein individual incoming transport blocks are associated with respective individual processes;
calculating the storage space needed for the individual incoming transport blocks associated with the respective individual processes;
storing the individual incoming transport blocks associated with the respective individual processes in the subpartitions; and
dynamically reallocating variable storage capacities for each of the subpartitions in the partitions such that a size of the subpartitions changes between successive transmission periods.

15. The method of claim 14, wherein control information associated with individual transport blocks is used to generate parameters to dynamically allocate the storage capacity.

16. The method of claim 14, wherein the storage space needed for individual transport blocks is calculated based on a size of a set of transport blocks on the plurality of incoming transport blocks.

17. The method of claim 14, wherein:
each individual partition comprises two subpartitions; and
the memory buffer comprises sixteen individual subpartitions associated with eight individual processes.

18. The method of claim 14, wherein the storage of the individual transport blocks in the subpartitions of the partitions comprises an address protocol using a maximum of three address bits.

* * * * *